(12) United States Patent  
Weimann et al.

(10) Patent No.: US 8,374,473 B2
(45) Date of Patent: Feb. 12, 2013

(54) TIGHT-BUFFERED OPTICAL FIBER HAVING IMPROVED FIBER ACCESS

(75) Inventors: Peter A. Weimann, Atlanta, GA (US); Timothy Goddard, Newnan, GA (US); Heng Ly, Stone Mountain, GA (US)

(73) Assignee: OFS Fitel, LLC, Norcross, GA (US)

( * ) Notice: Subject to any disclaimer, the term of this patent is extended or adjusted under 35 U.S.C. 154(b) by 232 days.

(21) Appl. No.: 12/774,062

(22) Filed: May 5, 2010

(65) Prior Publication Data

US 2011/0274397 A1    Nov. 10, 2011

(51) Int. Cl.
  *G02B 6/02* (2006.01)
(52) U.S. Cl. .................................. 385/128; 427/163.2
(58) Field of Classification Search ............. 385/128; 427/163.2
  See application file for complete search history.

(56) References Cited

U.S. PATENT DOCUMENTS

| | | | |
|---|---|---|---|
| 5,761,363 A * | 6/1998 | Mills ............................. | 385/114 |
| 6,195,491 B1 | 2/2001 | Jackson et al. | |
| 6,208,790 B1 | 3/2001 | Zopf et al. | |
| 6,321,014 B1 * | 11/2001 | Overton et al. .............. | 385/114 |
| 6,415,085 B1 | 7/2002 | Graham et al. | |
| 7,085,465 B2 * | 8/2006 | Ono et al. .................... | 385/128 |
| 7,221,841 B2 | 5/2007 | Chase et al. | |
| 7,295,737 B2 | 11/2007 | Moorjani et al. | |
| 2008/0125546 A1 | 5/2008 | Yamaguchi et al. | |

* cited by examiner

*Primary Examiner* — Omar Rojas
(74) *Attorney, Agent, or Firm* — Sutherland Asbill & Brennan LLP

(57) ABSTRACT

Certain embodiments of the invention may include systems and methods for providing tight-buffered optical fiber having improved fiber access. According to an example embodiment of the invention, a method for making a tight buffer upcoated optical fiber having a predetermined buffer stripping force is provided. The method includes controlling residual acrylate unsaturation (RAU) and oxygen in at least an outer surface of un-buffered optical fiber to achieve a predetermined buffer stripping characteristic, applying a tight buffer composition comprising acrylate to the un-buffered optical fiber, and curing the tight buffer composition.

18 Claims, 5 Drawing Sheets

TIGHT-BUFFERED OPTICAL FIBER HAVING IMPROVED FIBER ACCESS

FIELD OF THE INVENTION

This invention generally relates to optical fiber, and more specifically, to optical fiber having a tight-buffered upjacket.

BACKGROUND OF THE INVENTION

Optical glass fibers typically include a waveguide formed by a central core surrounded by a cladding material. The core and cladding are usually coated with additional layers to help protect the delicate waveguide during handling and to shield the waveguide against external stresses that may cause microbend losses, etc. In some cases, the core and cladding are coated with a primary layer and a secondary layer. The primary and secondary layers are usually ultra-violet curable polyacrylates, and are typically designed with properties in the cured state that provide the desired protection to the core and cladding. For example, a cured primary layer may be relatively soft to help cushion the core and cladding from external stresses. The cured secondary layer may be relatively harder (with higher Young's modulus than the primary layer, for example) to help protect the primary layer during handling, and to effectively shield the optical fiber from certain external forces and stresses. Single layer coatings may also be utilized, where the primary and secondary layer are combined into a single layer having properties that are intermediate to the secondary layer and the primary layer.

Certain optical fiber manufacturing facilities prepare the optical fiber, as described above, using an in-line process, where the liquid prepolymer primary and secondary coatings are successively applied in-line, immediately after the glass fiber is drawn from a preform, followed by curing with ultra-violet radiation. In some processes, coloring may be added to the secondary coating for fiber identification and to eliminate a separate off-line coloring process. However, depending on the requirements of the final product, the manufacturer may spool the colorless, coated fiber and perform coloring in a separate offline process. A colored tertiary layer may be applied to the coated fiber in a separate coloring process for identification purposes. In some cases, it is not necessary to color the optical fiber. The colored or uncolored coated optical fiber is generally about 250 microns in diameter.

The resulting colored or colorless optical fiber may further require additional protection, and therefore, may be further surrounded by a protective buffer, sheath, upjacketing or other protective layers such as yarns, tapes, and/or gels. The protective upjacket may be in the form of a "loose-tube buffer" or a "tight-buffer." In a loose-tube buffer, there may be a substantial void between the optical fiber and the buffer tube. The void is sometimes filled with a gel material to allow the fiber to "float" within the tube, or may contain a water-swellable thread to prevent water ingress inside the hollow tube. However, in a tight-buffered fiber, the buffer material typically coats and surrounds the coated optical fiber, and there is generally no void between the buffer inner surface and the coated optical fiber outer surface.

Common outer diameters for tight-buffered optical fibers are 500, 600, and 900 microns, although other diameters are possible. Current tight-buffered optical fibers generally utilize thermoplastic material such as poly (vinyl chloride) (PVC), polyethylene (PE), mineral-filled flame-retardant polyethylene, or nylon as buffer jacket material, and these buffer-coating materials are generally applied in an extrusion process. Because of the nature of thermoplastic and thickness of material, it is often difficult to remove such jacket materials in order to access the fiber in a finished optical fiber product. The jacket removal process can require special tools, and often results in fiber damage. Strong adhesion between the fiber and jacket material can require excessive strip force to remove the buffer, and may hinder fusion splicing and/or terminating the optical fiber with connectors. Certain manufacturers have made buffered fiber with a "slip layer" between the coated fiber and the buffer tubing to help reduce the adhesion of the buffer to the coated fiber. Some buffered fiber products exist where the slip layer includes a gel or a greasy substance that often leaves behind a residue that requires cleaning from the coated fiber after the buffer is removed.

Certain other solutions have emerged to address the problem of excessive strip force. For example, researchers have proposed the use of acrylate UV-curable materials rather than thermoplastic upjacketing material. Compared to thermoplastics, the UV-cured materials provide advantages in processing, supporting higher line speeds and allowing equipment with a smaller footprint. However, even with these UV-cured coatings, the buffer can still be difficult to remove. U.S. Pat. No. 7,295,737 discloses a UV-curable "upcoating", and an addition of a slip layer disposed between the optical fiber and the upcoating. Materials disclosed in this patent for the slip layer include micronized poly-tetra-fluro-ethylene (PTFE), silicone, and other dispersing agents. Therefore, it would be reasonable to assume that a certain amount of additional handling of the fiber would be required to clean the residue from the slip layer away from the coated fiber after removing the buffer, and before terminating the fiber.

U.S. Pat. No. 7,221,841 discloses radiation-curable buffer material that includes a flame retardant material and certain other buffer material properties. The patent also discloses a method that results in certain buffer strip force based on line speed and cure of buffer material. A similar idea for controlling the adhesion between the coated fiber and the buffer is disclosed in U.S. Pat. No. 7,295,737, albeit without requiring the flame retardant. Both U.S. Pat. Nos. 7,221,841 and 7,295,737 relate to the composition and processing of the buffer layer.

A need remains for improved systems and methods for providing a tight-buffered optical fiber with improved fiber access.

BRIEF SUMMARY OF THE INVENTION

Some or all of the above needs may be addressed by certain embodiments of the invention. Certain embodiments of the invention may include systems, methods, and apparatuses for providing tight-buffered optical fiber with improved fiber access.

According to an example embodiment of the invention, a method for making a tight buffer upcoated optical fiber having a predetermined buffer stripping force is provided. The method includes controlling residual acrylate unsaturation (RAU) and oxygen in at least an outer surface of un-buffered optical fiber to achieve a predetermined buffer stripping characteristic, applying a tight buffer composition comprising acrylate to the un-buffered optical fiber; and curing the tight buffer composition.

According to another example embodiment, another method for making a tight buffer upcoated optical fiber having a predetermined buffer stripping force is provided. The method includes controlling oxygen surrounding at least a portion of an outer surface of an un-buffered optical fiber during cure to achieve a predetermined buffer stripping characteristic, applying a tight buffer composition comprising acrylate to the oxygen-controlled-cured outer surface of the un-buffered optical fiber; and curing the tight buffer composition.

According to another example embodiment, a buffered optical fiber is provided. The buffered optical fiber includes an optical fiber. The optical fiber includes a core, a cladding surrounding the core, a primary layer surrounding the cladding, a secondary layer surrounding the primary layer, and a tertiary layer surrounding the secondary layer. The tertiary layer includes at least an outer functionalized surface having about 2% to about 30% residual acrylate unsaturation (RAU). The buffered optical fiber also includes a buffer made of acrylate material that surrounds the optical fiber, and the buffer is strippable from the optical fiber. According to an example embodiment, the buffer is strippable from the optical fiber with a strip force in the range of about 200 grams to about 1500 grams.

Other embodiments and aspects of the invention are described in detail herein and are considered a part of the claimed invention. Other embodiments and aspects can be understood with reference to the following detailed description, accompanying drawings, and claims.

BRIEF DESCRIPTION OF THE FIGURES

Reference will now be made to the accompanying tables and drawings, which are not necessarily drawn to scale, and wherein.

DETAILED DESCRIPTION OF THE INVENTION

Figure 1:
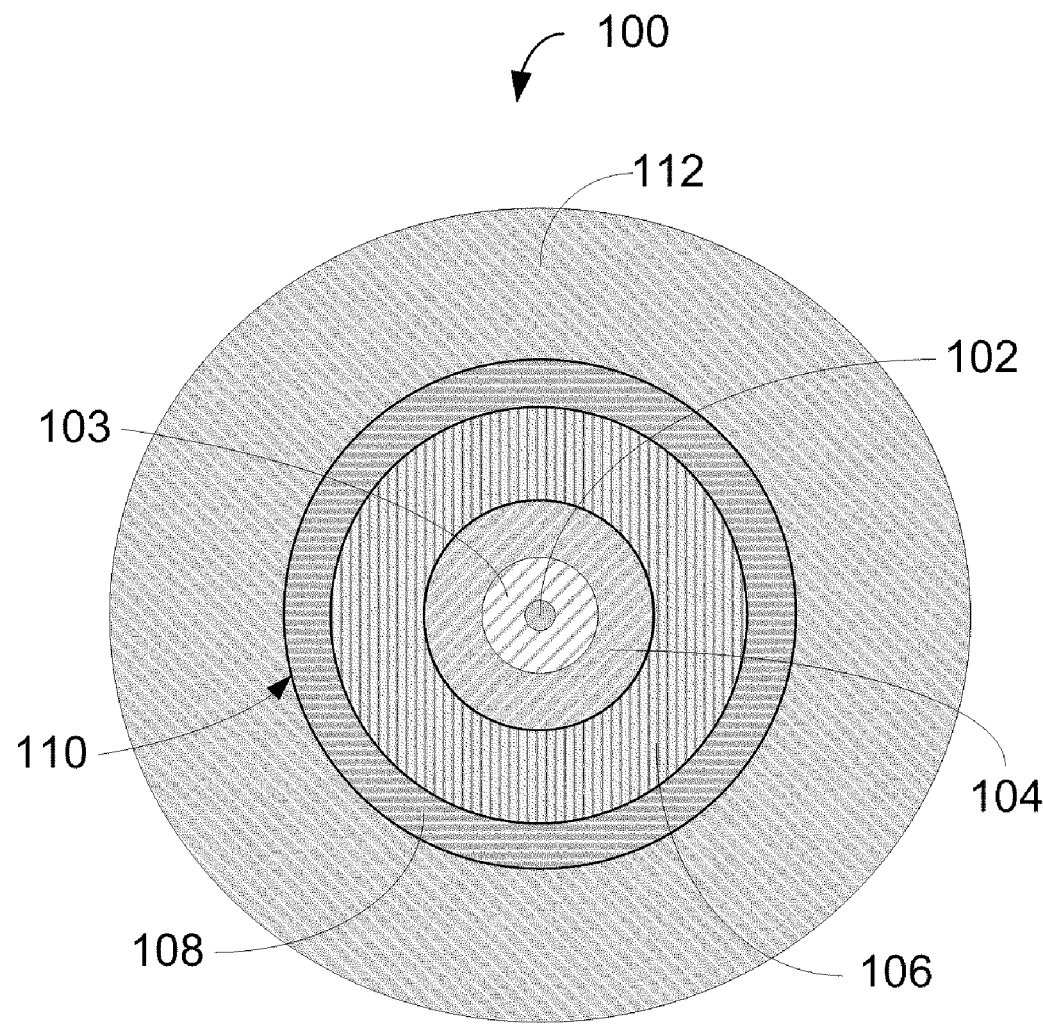
FIG. 1 is an end view of an illustrative tight-buffered optical fiber, according to an example embodiment of the invention.

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Certain embodiments of the invention may enable making or providing a tight-buffered optical fiber with a removable buffer. According to certain example embodiments, the adhesion between the coated optical fiber and the buffer material may be controlled by controlling the cure of the coated optical fiber outer layer before the buffer material is applied to the coated optical fiber. Therefore, according to example embodiments, the resulting strip force required to remove the buffer may be controlled by controlling the degree of cure, or percentage of residual acrylate unsaturation (RAU) in the outer layer of the un-buffered optical fiber prior to application of the buffer layer. This method is a departure from other methods that control the adhesion of the buffer layer to the fiber by controlling the buffer material processing and composition, or by adding intervening slip layers rather than addressing the layer or surface conditions of the underlying fiber coatings.

According to example embodiments of the invention, by varying amount of cure and oxygen content on the surface of the primary, secondary, or tertiary coated fiber, the adhesion between the fiber outer coating and the ultraviolet (UV)-cured buffer material can be adjusted so that the degree of ease or difficulty of stripping the buffer and accessing fiber can be tailored for specific applications. In addition, embodiments of invention do not require use of additional slip layer materials or filling compounds.

According to an example embodiment of the invention, adhesion between fiber and UV-cured buffer material may be controlled through fiber surface cure during the coating and curing processing of the un-buffered fiber, for example, during the fiber coloring process. In example embodiments of the invention, fiber surface cure may be controlled by residual acrylate unsaturation (RAU) and/or by controlling the amount of oxygen surrounding the fiber during the ultraviolet curing process. For example, if a coated fiber (colored or uncolored) is cured with low lamp power or fast processing speed, it may have higher RAU and may form a stronger bond to buffer material. On the other hand, if the coated fiber is cured with high lamp power or slow processing speed, it may have lower RAU, and the resulting coating may form a weaker bond with the buffer material.

In accordance with example embodiments of the invention, oxygen present during coating and cure can inhibit the surface cure and may lead to higher RAU, which may in turn promote adhesion between the outer (colored or uncolored) acrylate interface and the buffer material. For example, if fiber is coated and cured at slow speed and high power, the coating may have high cure and low RAU. In this case, adhesion between the outer layer and buffer material may be low. However, if oxygen is introduced during the coating and curing process, the coating surface cure may be inhibited, and even though the RAU in the bulk coating material may be low, the adhesion between the outer (colored or uncolored) acrylate interface and the buffer material may be higher due to the presence of oxygen during cure. Likewise, if the fiber is coated and cured at fast speed and low power, and without oxygen, the coating may have high RAU, and the resulting fiber may have a high adhesion between the outer coating layer and the buffer material.

According to an example embodiment of the invention, the level of RAU in the coating may be determined by probing a sample with radiation having a wavelength or wave-number corresponding to a multiple of the carbon-carbon double bond length. In an example embodiment, radiation energy absorption in the sample may be utilized to determine the energy of atomic motion, which may provide a measure of the percentage of carbon-carbon double bonds that still exist in the material, or a measure of the amount of material that has not yet cross-linked.

According to an example embodiment of the invention, another way to adjust adhesion is to control the amount of oxygen present during fiber coloring and/or curing process. The presence of oxygen inhibits the cure in the outer fiber surface, leaving greater amount of RAU and oxygen itself to react with UV-buffered material during buffering process. Therefore, fiber exposed to greater amount of oxygen during fiber coloring process may bond stronger to UV-buffered material in buffering process. If fiber is exposed to lesser amount of oxygen during fiber coloring, it may bond weaker to UV-buffered material during buffering process. According to example embodiments, the amount of oxygen may be controlled to be either greater or less than the approximate 21% of oxygen in natural atmospheric air. For example, oxygen may be reduced during cure by introducing a controlled amount of purge gas (for example, nitrogen) into appropriate sections of the fiber coloring line or the curing oven, as will be subsequently described.

Various coating and curing systems for making tight-buffered optical fiber, according to example embodiments of the invention, will now be described with reference to the accompanying figures.

FIG. 1 illustrates an example end view of an illustrative tight-buffered optical fiber 100, according to an example embodiment of the invention. In an example embodiment, an optical fiber may include a core 102, a cladding 103 surrounding the core 102, a primary layer 104 surrounding the cladding 103, a secondary layer 106 surrounding the primary layer 104, and a tertiary layer 108 surrounding the secondary layer 106. In certain embodiments, the primary layer 104 and the secondary layer 106 may be a combined layer. According to an example embodiment, the optical fiber 100 may include a colored tertiary layer 108. In certain embodiments, the tertiary layer 108 may be omitted. In yet other embodiments of the invention, the secondary layer 106 may be colored or uncolored.

According to example embodiments, the outer layer of the coated optical fiber may have a functionalized surface 110 that may be further surrounded by a buffer material 112 comprising an acrylate material, wherein the buffer 112 is strippable from the coated optical fiber. In certain embodiments the functionalized surface 110 may be associated with a colored or uncolored tertiary layer 108. Yet in other example embodiments, the optical fiber 100 may not require the tertiary layer 108, and instead, the functionalized surface 110 may be associated with a colored or uncolored secondary layer 106. In all of the embodiments (tertiary layer 108 present, or omitted, resulting un-buffered outer layer colored or uncolored) the outer un-buffered layer may be functionalized, and may be coated with a buffer material 112 such that the buffer material 112 is in intimate contact with the functionalized surface 110 to make tight-buffered optical fiber 100. According to example embodiments, the resulting tight-buffered optical fiber 100 may have a diameter of up to 900 microns. In other example embodiments, the diameter of the tight-buffered optical fiber 100 may be greater than 900 microns. In other example embodiments, the diameter of the tight-buffered optical fiber 100 may be less than 900 microns, for example, the diameter of the tight-buffered optical fiber 100 may be about 500 or about 600 microns.

Figure 2:
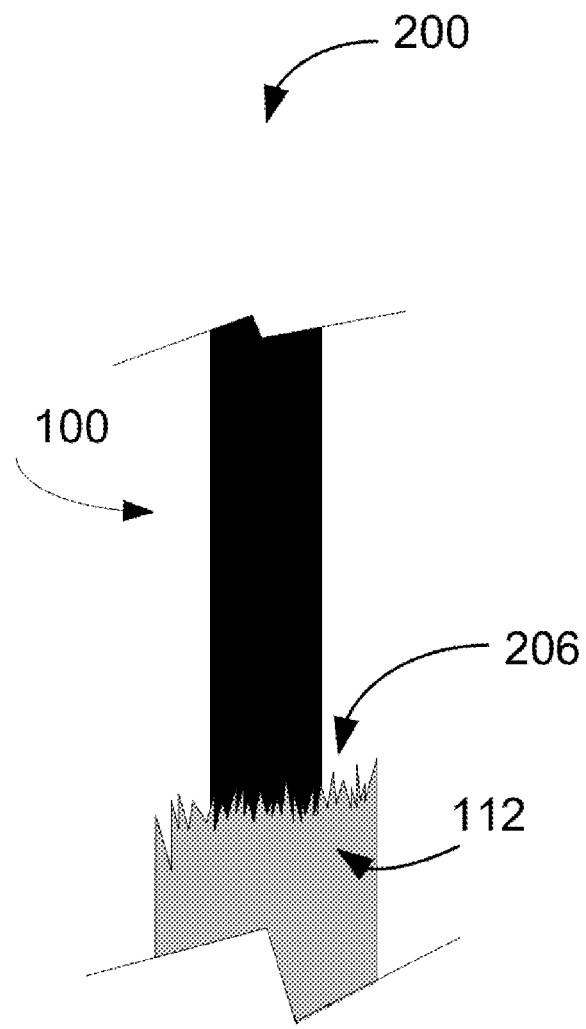
FIG. 2 is an illustrative side view of a tight-buffered optical fiber with part of the buffer removed, according to an example embodiment of the invention.

FIG. 2 depicts an illustrative side view of the tight-buffered optical fiber (as in 100 from FIG. 1) with a portion of the buffer 112 removed. The figure depicts an interface 206 where a portion of the buffer material 112 has been removed from the tight-buffered optical fiber 100. In accordance with example embodiments of the invention the buffer 112 is strippable from the optical fiber, with a strip force ranging from of about 200 grams to about 1500 grams. In a certain embodiments, the buffer 112 is strippable from the optical fiber, with a strip force less than about 1400 grams.

Figure 3:
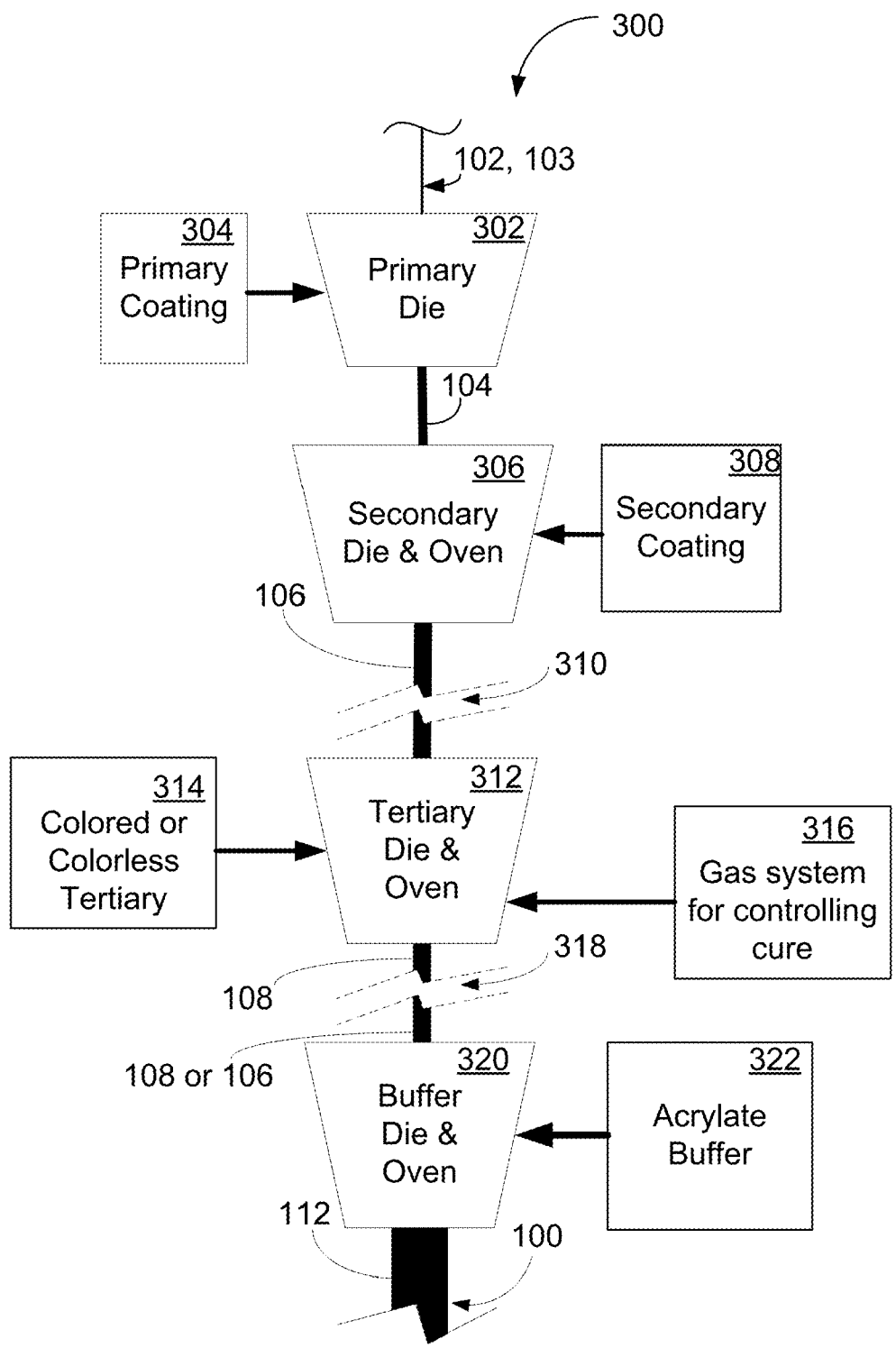
FIG. 3 is a schematic block diagram of one or more systems for making tight-buffered optical fiber, according to an example embodiment of the invention.

FIG. 3 shows a block diagram of one or more coating systems 300 for making tight-buffered optical fiber, according to an example embodiment of the invention. According to an example embodiment, a drawn glass optical fiber core (for example, 102 from FIG. 1), surrounded with a cladding (for example, 103 from FIG. 1), may enter a primary die 302 where a primary coating 304 may be applied to cladding layer (for example, 103 from FIG. 1). The primary die may include an oven for curing the primary coating (as in 104 from FIG. 1), or the fiber may continue to the next coating stage before it is cured. The resulting fiber may have a primary coating (as in 104 from FIG. 1) (cured or uncured) on the outer surface. According to example embodiments, the primary coated optical fiber may enter a secondary die and oven 306 where a secondary coating 308 may be applied to the primary coating (as in 104 from FIG. 1). In accordance with example embodiments, the secondary layer may be cured in the oven portion of the secondary die and oven 306, and as a result, any uncured material in the primary coating (as in 104 from FIG. 1) may be additionally cured. According to certain embodiments, the secondary coating layer (as in 106 from FIG. 1) may be colored or colorless. According to certain embodiments, particularly in embodiments where a tertiary layer is not required, the cure of secondary layer (as in 106 from FIG. 1) may be controlled to functionalize the outer surface of the secondary layer (as in 106 from FIG. 1) for controlling adhesion to a buffer (as in 112 from FIG. 1). The diameter of the secondary layer (as in 106 from FIG. 1) is typically about 242 microns. Colored fibers typically have a diameter of about 252 microns.

As indicated in FIG. 3, the coating process may include one or more offline processes 310. For example, once the fiber is drawn and the secondary layer (as in 106 from FIG. 1) is applied and cured, the optical fiber may be spooled and taken to a post draw or coloring process to be colored. In accordance with an example embodiment of the invention, the fiber may then be fed into a tertiary die and oven 312 and a colored or colorless tertiary coating 314 may be applied to coated fiber, such that the tertiary coating 314 surrounds and is contact with the secondary layer 106.

In an example coloring process, the fiber may enter the coating die 312 and may be coated with a colored or colorless tertiary coating 314. If the tertiary coating is colored, it will usually include an ink or pigment. According to example embodiments, the fiber may exit the die and may enter the oven portion of the tertiary die and oven 312. Prior to entering the UV oven, and according to an example embodiment of the invention, a gas system 316 for controlling cure may inject nitrogen or another inert gas or combination of gasses into the fiber path to inhibit oxygen from depositing on the un-cured fiber surface. The presence of oxygen tends to inhibit cure, and oxygen may react with subsequent layers. The amount of cure for a particular layer may depend on the oxygen level, the oven UV power, and the speed of the fiber line. For example, with high oven UV power and slow speeds, the fiber will be exposed to a relatively high radiation dosage, and the coatings will cure to a high degree (e.g., low RAU). However, if the line speed is fast, and/or the UV lamp power is low, the coatings may be partially uncured, and may have a high percentage of RAU. The presence of oxygen before and/or during cure may inhibit cure on the surface, and may increase the RAU on the surface.

FIG. 3 indicates another optional offline process 318. In certain example embodiments, fiber coated with a colored or colorless tertiary layer (as in 108 from FIG. 1), or fiber having bypassed the tertiary coating process, but having a colored or colorless secondary layer (as in 106 from FIG. 1), may enter the buffer coating line at this point. According to example embodiments, the buffer line may include similar equipment as is used in a separate fiber coloring line. For example, in certain embodiments, the buffer line may include pay-off mechanisms for feeding the spooled fiber into the buffer die and oven 320. In an example embodiment, ultraviolet curable acrylate-based buffer material 322 may be applied to the fiber that has already been coated with the secondary layer (as in 106 from FIG. 1) and/or the tertiary layer (as in 108 from FIG.

1). According to an example embodiment, the fiber coated with buffer (as in 112 from FIG. 1) may exit the die, and may enter a UV curing oven portion of the buffer die and oven 320. After the buffer has been cured, the tight-buffered optical fiber (as in 100 from FIG. 1) may be taken up and spooled as final product.

As mentioned above, the adhesion of the buffer (as in 112 from FIG. 1) to the underlying layer depends on the conditions of cure for the underlying layers. In the case of optical fiber having a colored tertiary layer (as in 108 from FIG. 1), for example, the buffer layer may react with un-cured material in the colored tertiary layer (as in 108 from FIG. 1), and may create a stronger bond between the two layers, and thus, a higher adhesion requiring higher strip force may be required to remove the buffer. If the colored tertiary layer (as in 108 from FIG. 1) had a high cure level or a low RAU, for example, it may have less un-cured material available to react with the buffer material, and may therefore create weaker bonds between the two materials, resulting in lower adhesion. Therefore, according to example embodiments of the invention, the buffer strip force may be approximately set, as desired, by adjusting cure conditions including UV dosage, line speed, and/or oxygen level in the outer layer of the coated, un-buffered optical fiber prior to applying the buffer material. In accordance with example embodiments of the invention, the RAU may be controlled to result in uncured material ranging from about 2% to about 30% of unreactive material in at least the outer surface of the un-buffered fiber.

Example embodiments of the invention may be utilized to control RAU in an optical fiber secondary layer, and this layer may be colored or colorless. Other example embodiments of the invention may be utilized to control RAU in an optical fiber tertiary layer, and this layer may be colored or colorless. According to example embodiments, controlling RAU in at least an outer surface of un-buffered optical fiber may include controlling oxygen surrounding the outer surface during cure. In an example embodiment, controlling oxygen may include controlling a ratio of oxygen to inert gas in a center tube. According to example embodiments, the oxygen percentage may be controlled between about 0.5% and about 15%. In certain example embodiments, atmospheric oxygen, up to approximately 21%, may be controlled and utilized in conjunction with line speed and ultraviolet lamp power to control the RAU of the un-buffered optical fiber.

Referring again to FIG. 1, and in accordance with example embodiments, the resulting buffered optical fiber may include an optical fiber comprising a core 102, a cladding 103 surrounding the core 102, a primary layer 104 surrounding the cladding 103, and a colored or colorless secondary layer 106 surrounding the primary layer 104. In one embodiment, the secondary layer 106 may include at least an outer surface 110 having about 2% to about 30% residual acrylate unsaturation (RAU). In certain embodiments, a colored or colorless ultraviolet curable tertiary layer 108 may surround the secondary layer 106. The tertiary layer 108 may include at least an outer surface 110 having about 2% to about 30% residual acrylate unsaturation (RAU). The optical fiber may include a buffer 112 made of an ultraviolet curable acrylate material that surrounds the optical fiber. According to example embodiments, the buffer is strippable from the optical fiber with a strip force in the range of about 200 grams to about 1500 grams. According to example embodiments, the buffer may have a diameter of up to 900 microns. According to an example embodiment, the secondary layer and/or the buffer each have a glass transition temperature in the range of about 60 degrees Celsius to about 90 degrees Celsius. According to an example embodiment, the tertiary layer and the buffer may have a glass transition temperature of about 83 degrees Celsius.

Figure 4:
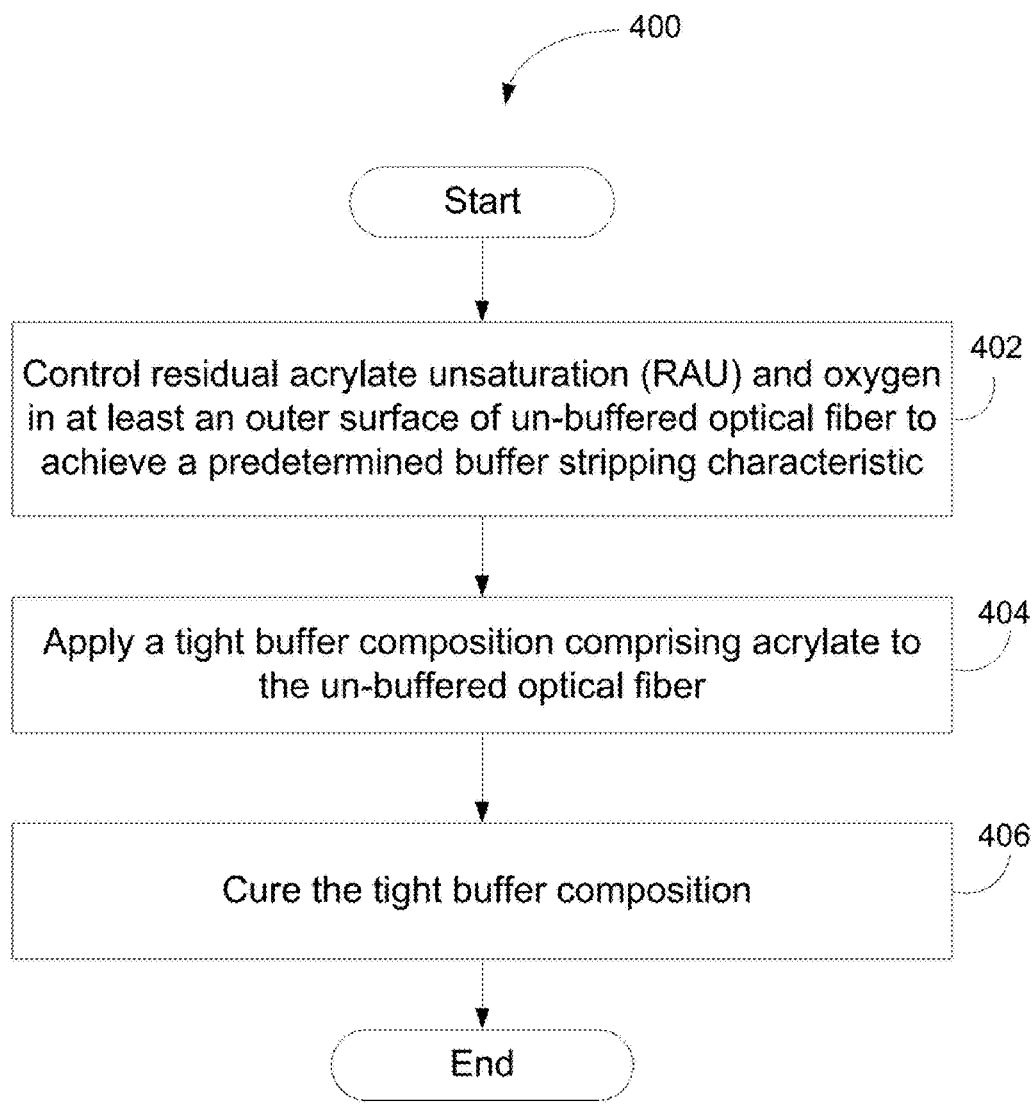
FIG. 4 is a flow diagram of an illustrative method according to an example embodiment of the invention.

An example method 400 for making a tight buffer upcoated optical fiber having a predetermined buffer stripping force will now be described with reference to the flowchart of FIG. 4. The method starts in block 402 where residual acrylate unsaturation (RAU) in at least an outer surface of un-buffered optical fiber is controlled. In block 404 and according to an example embodiment of the invention, a tight buffer composition comprising acrylate is applied to the RAU-controlled un-buffered optical fiber. In block 406, and according to an example embodiment, the tight buffer composition is cured. The method ends after block 406.

Figure 5:
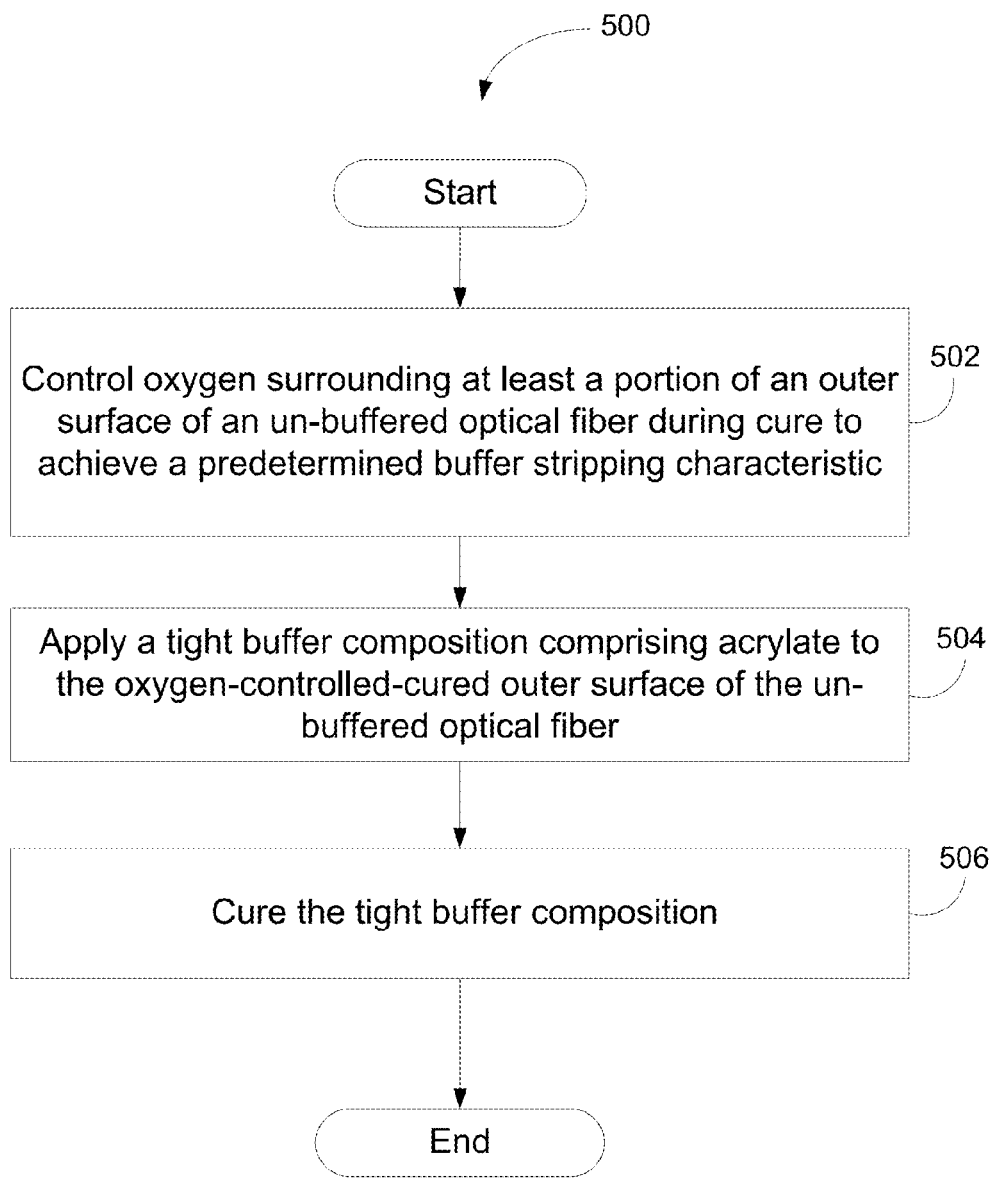
FIG. 5 is another flow diagram of an illustrative method according to an example embodiment of the invention.

Another example method 500 for making a tight buffer upcoated optical fiber having a predetermined buffer stripping force will now be described with reference to the flowchart of FIG. 5. The method starts in block 502 where oxygen surrounding at least a portion of an outer surface of an un-buffered optical fiber is controlled. In block 504 and according to an example embodiment of the invention, a tight buffer composition comprising acrylate is applied to the oxygen-controlled-cured outer surface of the un-buffered optical fiber. In block 506, and according to an example embodiment, the tight buffer composition is cured. The method ends after block 506.

An example technique for measuring the strip force of a buffer material, in accordance with example embodiments of the invention, may be performed using a mechanical stripper. In certain embodiments, the mechanical stripper can be mounted onto a tensile strength measuring device, such as an Instron machine. In an example embodiment, the blade gap of the mechanical stripper can be adjusted to avoid damaging the glass fiber, yet small enough to strip off the coating. In certain example embodiments, a length (for example, 35 mm) of buffered fiber may be stripped under controlled conditions, and the peak stripping force may be measured.

In accordance with example embodiments of the invention, RAU and/or oxygen may be controlled in an optical fiber coating to achieve a predetermined buffer stripping characteristic. In an example embodiment, the predetermined buffer stripping characteristic can include a strip force in the range of about 200 grams to about 1500 grams.

In example embodiments of the invention, a gas (such as nitrogen, helium, argon, etc.) comprising a predetermined amount of oxygen may be utilized to at least partially surround or buffer the coated optical fiber before and/or during cure. However, in certain applications, it may be desirable for a certain (limited) degree of under-cure or stickiness on the outer coating surface, for example, when the optical fiber is to be additionally coated or colored. Therefore, according to another embodiment of the invention, the coating surface properties may be controlled by adding a small amount of oxygen to the predetermined gas Accordingly, example embodiments of the invention can provide the technical effects of creating certain systems and methods that allow optical fiber buffer strip force to be controlled and/or tailored for a specific application. Example embodiments of the invention can provide the further technical effects of providing systems and methods for eliminating buffer strip-layer materials from optical fiber products. These embodiments can provide the technical effect of producing buffered optical fiber that can have the buffer removed without creating greasy or messy residue from buffer strip-layer material.

As desired, embodiments of the invention may include the optical fiber 100 and the coating system 300 with more or less of the layers or components illustrated in FIGS. 1 and 3.

The invention is described above with reference to block and flow diagrams of systems, methods, and/or apparatuses, according to example embodiments of the invention. It will be understood that one or more blocks of the block diagrams and flow diagrams, and combinations of blocks in the block diagrams and flow diagrams may not necessarily need to be performed in the order presented, or may not necessarily need to be performed at all, according to some embodiments of the invention.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method for making a tight buffer upcoated ° optical fiber having a predetermined buffer stripping force comprising:
    controlling residual acrylate unsaturation (RAU) and oxygen in at least an outer surface of un-buffered optical fiber comprising controlling the RAU to within about 2% and 30% uncured material to achieve a predetermined buffer stripping characteristic;
    applying a tight buffer composition comprising acrylate to at least a portion of the un-buffered optical fiber to radially surround and contact the outer surface of the un-buffered optical fiber, wherein adhesion between the tight buffer composition and the outer surface of the un-buffered optical fiber is controlled by the controlling of the RAU in the outer surface of the un-buffered optical fiber;
    wherein the tight buffer composition does not include slip layer materials and application of the tight buffer composition to the outer surface of the un-buffered optical fiber does not include slip layer materials; and
    curing the tight buffer composition.

2. The method of claim 1, wherein controlling RAU and oxygen comprises controlling the RAU and oxygen in an optical fiber tertiary layer.

3. The method of claim 1, wherein controlling the RAU in at least an outer surface of un-buffered optical fiber comprises controlling oxygen surrounding the outer surface during cure.

4. The method of claim 3, wherein controlling oxygen comprises controlling a ratio of oxygen to inert gas in a center tube comprising a portion disposed outside of an oven for curing the outer surface, wherein controlling oxygen surround the outer surface comprises injecting into the portion of the center tube disposed outside of the over an inert gas.

5. The method of claim 1, wherein controlling RAU and oxygen comprises controlling the RAU and oxygen in at least an optical fiber colored layer.

6. The method of claim 1, wherein the predetermined buffer stripping characteristic comprises a strip force in the range of about 200 grams to about 1500 grams.

7. A method for making a tight buffer upcoated optical fiber having a predetermined buffer stripping force comprising:
    controlling oxygen surrounding at least a portion of an outer surface of an un-buffered optical fiber during cure to achieve a predetermined buffer stripping characteristic, wherein the predetermined buffer stripping characteristic comprises a strip force in the range of about 200 grams to about 1500 grams;
    applying a tight buffer composition comprising acrylate to at least a portion of the oxygen-controlled-cured outer surface of the un-buffered optical fiber to radially surround and contact the outer surface of the un-buffered optical fiber;
    wherein the tight buffer composition does not include slip layer materials and application of the tight buffer composition to the outer surface of the un-buffered optical fiber does not include slip layer materials; and
    curing the tight buffer composition.

8. The method of claim 7, wherein controlling oxygen comprises controlling oxygen surrounding at least a portion of an optical fiber tertiary layer during at least a portion of tertiary cure time.

9. The method of claim 7, further comprising controlling ultraviolet dosage during cure of at least an outer surface of un-buffered optical fiber, wherein controlling ultraviolet dosage comprises controlling at least line speed.

10. The method of claim 7, wherein controlling oxygen comprises controlling a percentage of oxygen in a center tube by injecting an inert gas into the center tube at a position outside of an oven for curing the outer surface of the un-buffered optical fiber.

11. The method of claim 10, wherein the percentage of oxygen is between 0.5% to 15%.

12. The method of claim 7, wherein controlling oxygen comprises providing a percentage of oxygen surrounding at least a portion of an outer surface of an un-buffered optical fiber during cure that is between about 0.5% and about 15%.

13. The method of claim 7, wherein controlling oxygen surrounding at least a portion of an outer surface of an un-buffered optical fiber during cure comprises injecting an inert gas into a fiber path.

14. The method of claim 13, wherein the inert gas is injected into the fiber path prior to the outer surface of the un-buffered optical fiber entering a ultraviolet oven.

15. A method for making a tight buffer upcoated optical fiber having a predetermined buffer stripping force comprising:
    controlling a percentage of oxygen surrounding at least a portion of an outer surface of an un-buffered optical fiber to between about 0.5% and about 15% during cure to achieve a predetermined buffer stripping characteristic, wherein the predetermined buffer stripping characteristic comprises a strip force in the range of about 200 grams to about 1500 grams;
    applying a tight buffer composition comprising acrylate to the oxygen-controlled-cured outer surface of the un-buffered optical fiber;
    wherein the tight buffer composition does not include slip layer materials and application of the tight buffer composition to the outer surface of the un-buffered optical fiber does not include slip layer materials; and
    curing the tight buffer composition.

16. The method of claim 15, wherein the application of the tight buffer composition surrounds at least a portion of the outer surface of the un-buffered optical fiber to provide no void between an inner surface of the tight buffer composition and the outer surface of the un-buffered optical fiber.

17. The method of claim 15, wherein controlling the percentage of oxygen surrounding at least a portion of an outer surface of the un-buffered optical fiber comprises injecting an inert gas into a fiber path.

18. The method of claim 17, wherein controlling the percentage of oxygen by injecting an inert gas into the fiber path comprises injecting the inert gas into a center tube in the fiber path at a position along the path outside of an oven for curing the outer surface of the un-buffered optical fiber as the un-buffered optical fiber passes through the center tube.

* * * * *